UNITED STATES PATENT OFFICE.

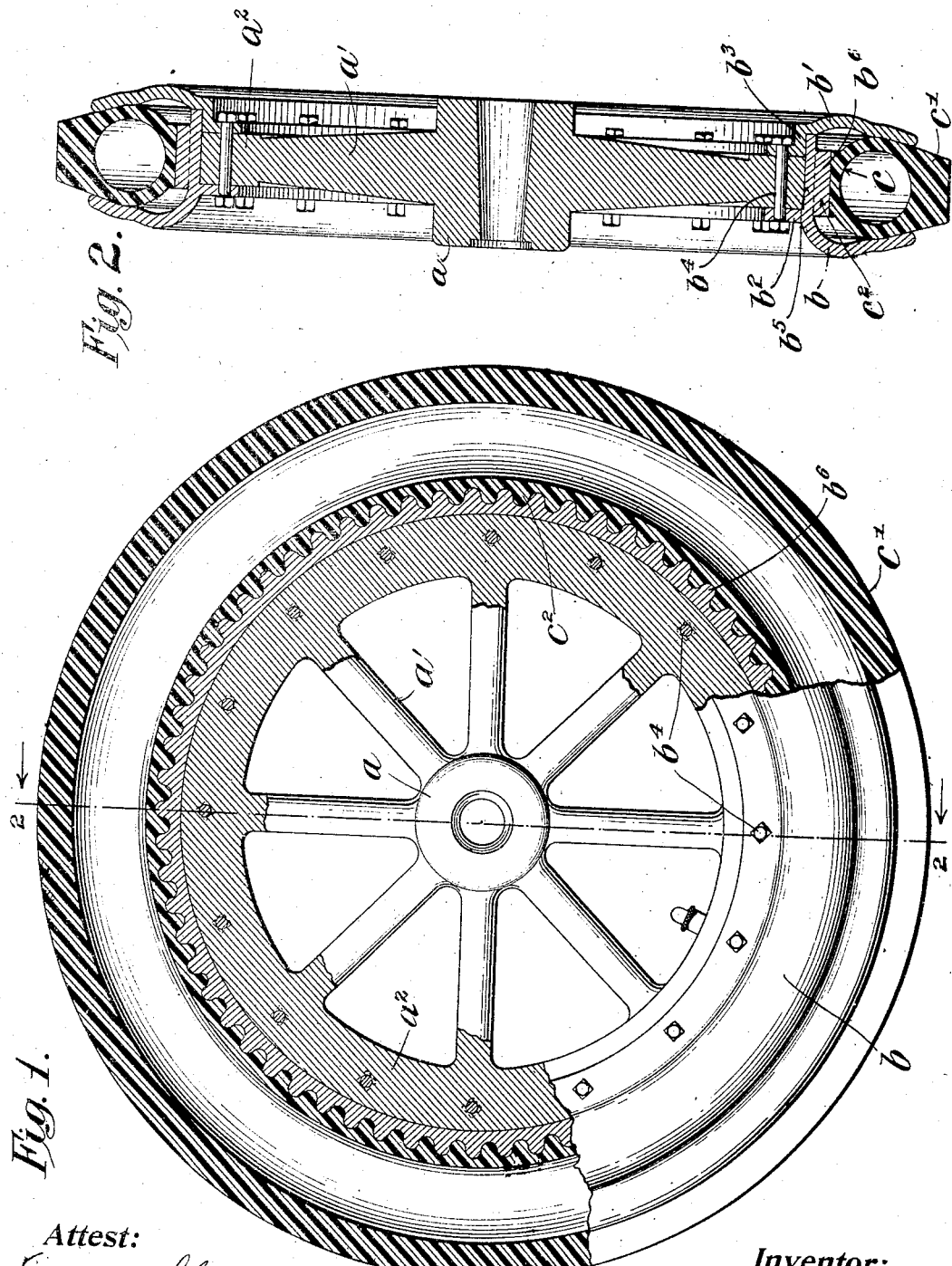

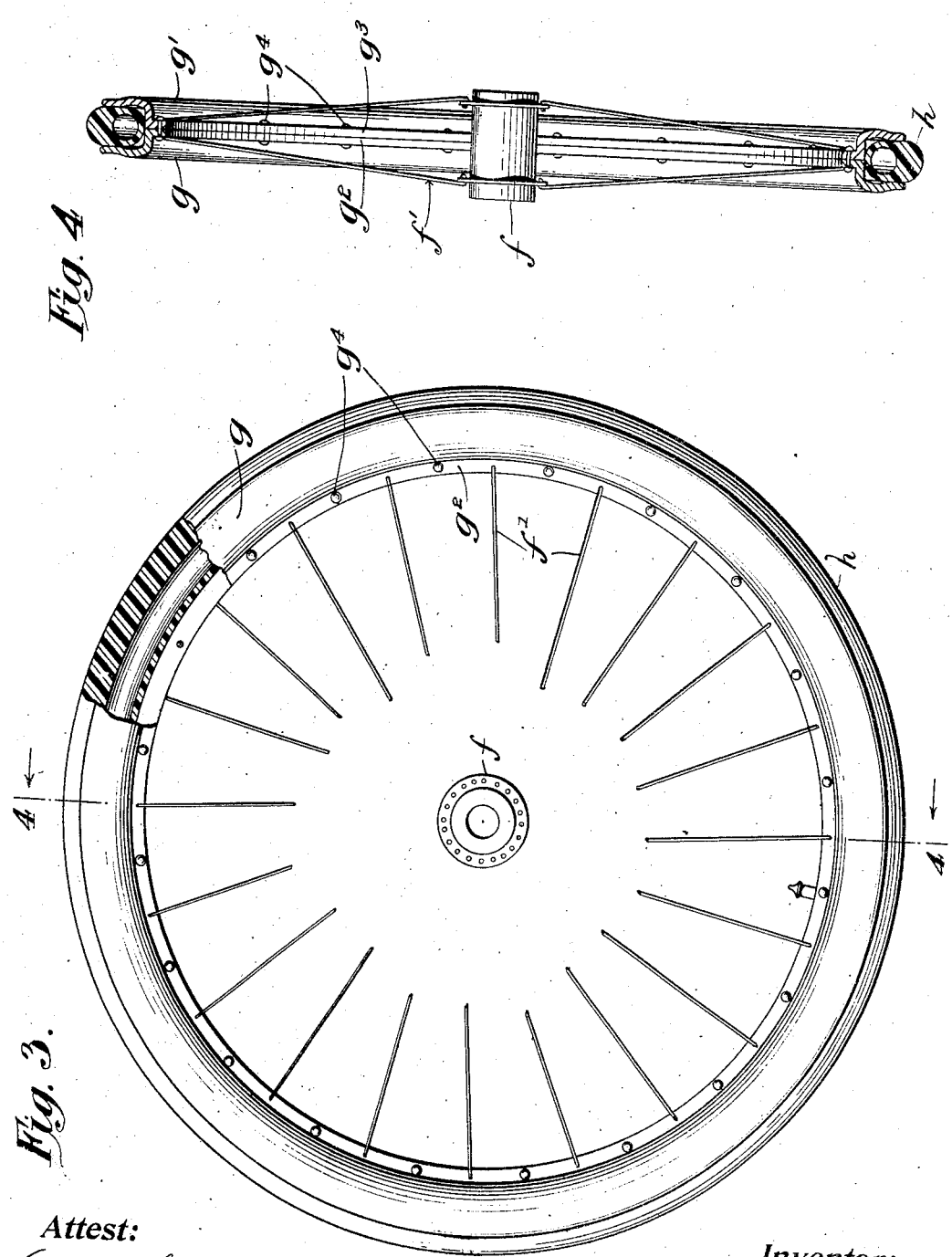

EPHRAIEM CHAQUETTE, OF NEW ROCHELLE, NEW YORK.

VEHICLE-WHEEL AND PNEUMATIC TIRE THEREFOR.

No. 829,461.      Specification of Letters Patent.      Patented Aug. 28, 1906.

Application filed September 11, 1905. Serial No. 277,872.

*To all whom it may concern:*

Be it known that I, EPHRAIEM CHAQUETTE, a citizen of the United States of America, and a resident of New Rochelle, in the county of Westchester and State of New York, have invented certain new and useful Improvements in Vehicle-Wheels and Pneumatic Tires Therefor, of which the following is a specification.

This invention relates to vehicle-wheels and pneumatic tires therefor; and it has for its object the provision of means preventing puncturing of said tires and means distributing the strain applied to the tires in practice generally throughout the entire circumferential area thereof.

In brief, my invention comprises a two-part peripheral channel or rim borne by the wheel, and a pneumatic tire fitted therein with space for expansion, the tread only of said tire being exposed beyond the protecting-walls of said channel and said tread being reinforced to avoid puncturing. The inner contacting surface of the pneumatic tire may be provided with a series of corrugations which mesh with corrugations upon the base of the channel forming the felly, in this manner avoiding the possibility of the pneumatic tire creeping at any point circumferentially of said felly.

In the drawings accompanying this application, Figure 1 is a side elevation, partly in section, of my improved wheel and tire. Fig. 2 is a section on the line 2 2 of Fig. 1. Fig. 3 is a side elevation, partly in section, of a modification; and Fig. 4 is a section on the line 4 4 of Fig. 3.

The letter $a$ indicates the hub of a wheel having the radial spokes $a'$, which are here shown as having a rim $a^2$. Mounted upon said wheel is a bipart peripheral channel composed of the vertical ring-plates $b$ $b'$, having, respectively, the inset flanges $b^2$ $b^3$, wherewith they are secured to the wheel, as by bolts $b^4$, passed through said flanges and wheel. The plate $b$ is also provided with a flange or felly-plate, as $b^5$, which lies against and encircles the wheel, said flange or felly-plate being provided with a series of transverse corrugations, as $b^6$, about its outer surface. The pneumatic tube or tire, as $c$, is adapted to fit slidably between the plates $b$ $b'$, the circumference of its air-space lying within the horizontal plane of the lower edges of said plates, whereby the latter, which are of metal, serve to protect said tire from attack at its side walls by any sharp pointed or edged article which may be met with on the road. The tread portion $c'$ of the pneumatic tire is thickened to protrude beyond the edges of the plates $b$ $b'$ and is provided with outwardly-converging side walls to allow said tube to ride freely between the contacting inner surfaces of the plates $b$ $b'$ in the compressing and relaxing action of said tube. The channel-plates may bulge outwardly somewhat toward their inner portion to provide space for the tube or tire when compressing or sliding inwardly. The extreme edges of the plates $b$ $b'$ may be slightly flared outwardly to avoid the danger of cutting or abrading the walls of the tire-tread.

In order that the pneumatic tube or tire may be securely connected to the felly-plate at all points about the circumference of the latter, said tube or tire is provided about its inner circumferential surface with a series of corrugations $c^2$, corresponding to and adapted to fit snugly between the corrugations $b^6$ upon the felly-plate. In this manner creeping of the tire circumferentially of its support is positively prevented and the union between these members is rendered continuous. The pneumatic tire or tube is easily adjusted in position or removed by disconnecting the plate $b'$ and slipping said tire or tube sidewise onto or off the corrugated surface of the felly-plate, the teeth or projections on the tire or tube entering and fitting snugly in the spaces between the corresponding teeth or projections on said felly-plate.

In Figs. 3 and 4 I have shown a modified form of wheel and tire more particularly intended for draft-vehicles and cycles, it being of a lighter construction. In said figures $f$ indicates the hub, having the radial spokes $f'$, and $g$ $g'$ indicate, respectively, the two portions of a bipart peripheral channel or felly, the said portions having corresponding flanges $g^2$ $g^3$, respectively, which meet centrally and are united by bolts, as $g^4$, the outer ends of the spokes $f'$ also being secured to said flanges. The channel, composed of the portions $g$ $g'$, receives the pneumatic tire, as $h$, and serves to protect the side walls thereof, as in the other form of my invention; but it may not be necessary in this lighter form to unite the tire and channel by corrugated surfaces.

It is to be understood that the references herein to a tire or tube imply a pneumatic tube, of rubber or the like, suitably reinforced with fabric, as well known in the art.

I claim—

1. In a vehicle-wheel, a bipart rim therefor composed of two, vertical, removable ring-plates having inset flanges, one of said plates having a corrugated base-flange, and bolts uniting said plates to the wheel.

2. In a vehicle-wheel, a bipart rim therefor composed of two, vertical, removable ring-plates having inset flanges, one of said plates having a corrugated base-flange, and bolts uniting said plates to the wheel; together with a pneumatic tire slidably fitted between said ring-plates, leaving inward clearances at opposite sides between said tire and ring-plates.

3. In a vehicle-wheel, a bipart rim therefor composed of two, vertical, removable ring-plates having inset flanges, one of said plates having a corrugated base-flange, and bolts uniting said plates to the wheel; together with a pneumatic tire slidably fitted between said ring-plates, the inner diameter of said tire lying within the peripheral edges of said ring-plates, and its tread portion extending beyond said peripheral edges.

4. In a vehicle-wheel, a bipart rim therefor composed of two, vertical, removable ring-plates having inset flanges, one of said plates having a corrugated base-flange, and bolts uniting said plates to the wheel; together with a pneumatic tire slidably fitted between said ring-plates, leaving inward clearances at opposite sides between said tire and ring-plates, the inner diameter of said tire lying within the peripheral edges of said ring-plates, and its tread portion extending beyond said peripheral edges.

5. In a vehicle-wheel, a bipart rim therefor, composed of two, vertical, removable ring-plates having inset flanges, one of said plates having a corrugated base-flange, forming a felly, and bolts uniting said flanges to the wheel, together with a pneumatic tire whose base is corrugated coincidently with the corrugations in said flange-plate, and adapted to mesh therewith.

6. In a vehicle-wheel, a bipart rim therefor, composed of two, vertical, removable ring-plates having inset flanges, one of said plates having a corrugated base-flange, forming a felly, said plates bulging outwardly near their inner circumference, and bolts uniting said plates to the wheel; together with a pneumatic tire slidable within the contracted space between said plates, leaving clearances between it and the bulging portions of said ring-plates, the base of said tire being corrugated coincidently with the corrugations in said felly-plate.

7. In a vehicle-wheel, a bipart rim therefor, composed of two, vertical, removable ring-plates having inset flanges, one of said plates having a corrugated base-flange, said corrugated base-flange lying against the inset flange of the opposite ring-plate, and bolts uniting said plates to the wheel.

Signed at New York this 9th day of September, 1905.

EPHRAIEM CHAQUETTE.

Witnesses:
F. W. BARKER,
DWIGHT W. DE MOTTE.